United States Patent
Takeuchi

[11] 3,845,692
[45] Nov. 5, 1974

[54] VACUUM SUSPENDED TYPE SERVO-MOTOR

[75] Inventor: Hiroo Takeuchi, Nagano-ken, Japan

[73] Assignee: Nisshin Kogyo Kabushiki Kaisha, Ueda-shi, Nagano-ken, Japan

[22] Filed: Mar. 30, 1973

[21] Appl. No.: 346,659

[30] Foreign Application Priority Data
Apr. 7, 1972  Japan.................................. 47-34928

[52] U.S. Cl.............................................. 91/369 B
[51] Int. Cl............................................... F15b 9/10
[58] Field of Search........... 91/369 B, 369 A, 369 R

[56] References Cited
UNITED STATES PATENTS

| | | | |
|---|---|---|---|
| 3,013,535 | 12/1961 | Schultz.............................. | 91/369 B |
| 3,026,853 | 3/1962 | Stelzer.............................. | 91/369 B |
| 3,385,167 | 5/1968 | Wilson et al. ..................... | 91/369 B |

*Primary Examiner*—Paul E. Maslousky
*Attorney, Agent, or Firm*—Waters Roditi, Schwartz & Nissen

[57] ABSTRACT

A servo-motor particularly adapted for use in the braking system of a road vehicle, comprising reaction means for transmitting an appropriate proportion of the load reaction back to the servo-motor input member thereby to enable the driver to lightly operate the braking system while accurately feeling the brake effort. The servo-motor also comprises control valve means of particular design effective to avoid any loss of vacuum.

3 Claims, 2 Drawing Figures

PATENTED NOV 5 1974 3,845,692

3,845,692

VACUUM SUSPENDED TYPE SERVO-MOTOR

BACKGROUND OF THE INVENTION

The present invention relates to servo-motors of the vacuum-suspended type and more particularly to those principally intended for use in the braking systems of road vehicles and the like and having a casing divided by a movable wall into two power chambers and an output member displaceable under the effect of the pressure difference occurring between the two chambers upon forward or input movement of the input member.

In such servo-motor, it is required that during operation of the input member the magnitude of the output load or the force acting upon the output member through the movable wall be at all times felt by the operator in order that the input member may be properly operated. For example, in the braking system of a road vehicle, any excessive motion of the input member may incur the danger of locking the wheels of the vehicle. Under these circumstances, some form of reaction means is usually employed to enable the driver rightly to feel the magnitude of the load being imposed upon the output member of the system. Conventional reaction means, however, has not been satisfactory in various respects, for example, in simplicity in construction and in reliability.

SUMMARY OF THE INVENTION

Accordingly, the present invention has for its object the provision of a vacuum suspended type servo-motor particularly adapted for use in the braking system of a road vehicle or the like and having incorporated therein a novel form of reaction means which is relatively simple in construction and reliable in operation.

Another object of the present invention is to provide a servo-motor of the character described which includes control valve means operable in response to the movement of the input member to control the pressure difference between the two power chambers of the servo-motor and reaction means arranged in association with the control valve means for simpler construction.

A further object of the present invention is to provide a servo-motor of the character described in which the control valve means can operate in an accurate and positive fashion despite the arrangement of such means association with the reaction means.

BRIEF DESCRIPTION OF THE DRAWING

The present invention will be described hereinafter with reference to the accompanying drawing, which illustrates a preferred embodiment of the invention and in which.

DESCRIPTION OF THE PREFERRED EMBODIMENT

Figure 1:
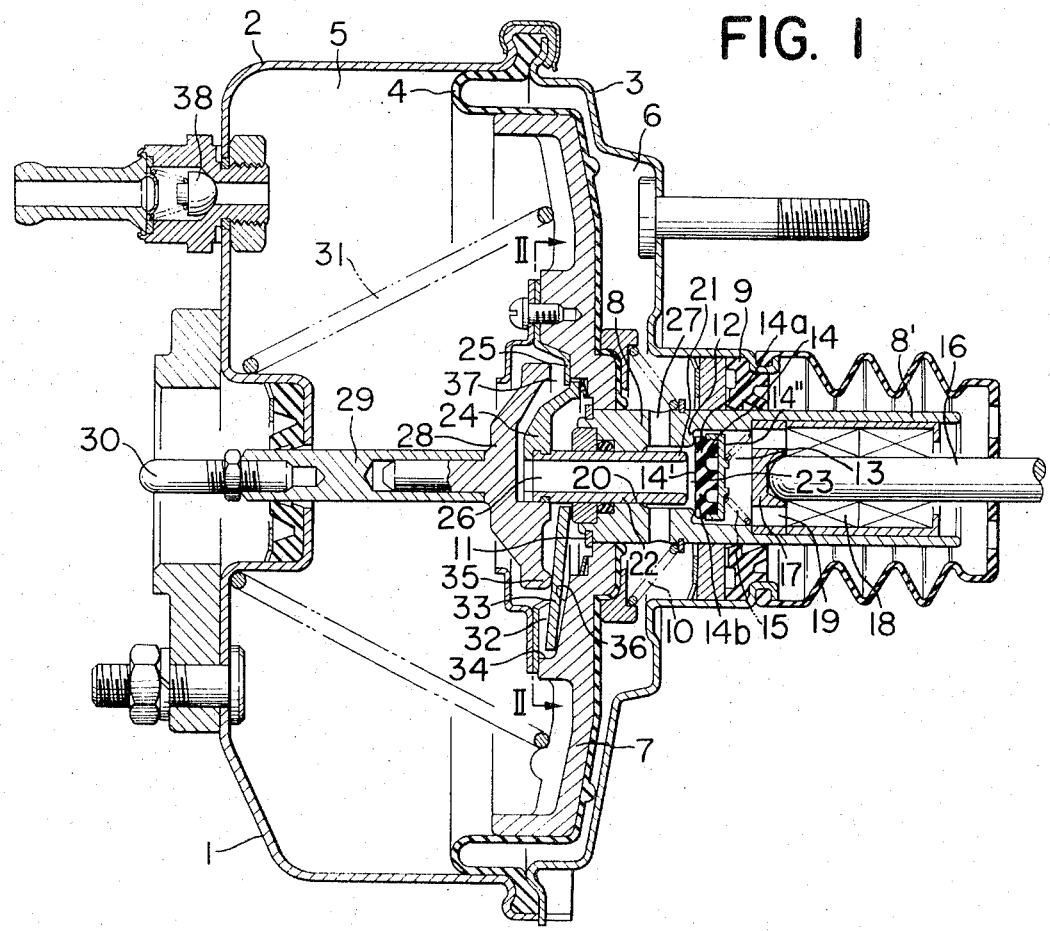
FIG. 1 is an axial cross-sectional view of a servo-motor embodying the present invention.

Referring to the drawing, the booster or servo-motor illustrated includes a casing generally indicated by numeral 1 and of the split type including casing sections 2 and 3. The interior space defined in the casing 1 is divided by a movable wall of elastic material or a diaphragm 4 into two compartments including a first power chamber 5 which is continuously in communication with a vacuum source such as the suction duct of an engine through a non-return valve 38 and a second power chamber 6 which is normally held in fluid communication with the first power chamber 5 through control valve means, which will be described hereinafter in detail.

The diaphragm 4 in the casing 1 is secured to the booster disc 7 for movement therewith, the outer peripheral edge of a diaphragm 4 being clamped between the front and rear casing sections 2 and 3. Also, the diaphragm 4 has a central aperture formed therein in alignment with one formed in the booster disc 7 and a generally cylindrically shaped input member 8 is slidably fitted at the front end thereof in these apertures for axial sliding movement therein relative to the diaphragm 4 which is held in engagement with the input member 8 with an appropriate amount of elastic force to provide a fluid seal therewith between the first and second power chambers 5 and 6.

The input member 8 has a rearwardly extending skirt portion 8' slidably fitted through an annular seal 9, which in turn is fitted in a rearwardly extending tubular bearing portion of the casing section 3 to seal the second power chamber 6 against the atmosphere.

A coiled valve spring 10 is arranged between the booster disc 7 and the input member 8, the latter carrying an annular stop ring 11 secured to the front shouldered end thereof to limit forward movement of the booster disc 7 relative to the input member 8 against the bias of the coil spring 10.

The input member 8 is formed therein with a valve chamber 13, which has a first valve port 12 and accommodates a poppet type valve element 14 of resilient material and a coiled spring 15 biasing the valve element into sealing pressure engagement with the first valve port 12 and specifically with an annular seat formed around the periphery of the first valve port 12, said valve element 14 being operable to control the servo-motor as will be described hereinafter in detail. A rigid plate 14'' is secured to that side of the valve element 14 which is opposite the sealing face 14' thereof. The radially outer portion 14a of the valve element 14 directly engageable with the valve port 12 is formed relatively thick for substantial rigidity while the radially inner portion 14b of the valve element, which is opposite to a second valve port 21 coaxial with the first valve port 12, is formed relative thin and readily deformable by means of appropriate recesses in the back side of the portion 14b.

The inside wall of the input member 8 is shouldered at the rear end of the valve chamber 13 to form an annular seat against which a bearing disc 17 is seated. The bearing disc 17 is recessed on one side thereof to receive the spherically shaped front end of a control member or push rod 16, which is axially displaceable by means of a brake pedal (not shown), and disc 17 has a number of through holes 19 for air passage therethrough. Air filter elements 18 are arranged in the skirt portion 8' of the input member 8 behind the bearing disc 17 and the control valve chamber 13 is thus always open to the external atmosphere through the air passages 19 in the bearing disc 17 and the filter elements 18.

Further, the input member 8 has an axial hole 20 of reduced diameter formed in the front portion thereof to slidably receive a tubular communicating element 22, which defines the above-mentioned second valve port 21 at the rear end thereof, forming part of the control valve means operable to provide and close off communication between the first and second power chambers 5 and 6. As shown, the second valve port 21 is directed to the valve chamber 23 in opposing relation to the sealing face 14' of the valve element 14. Secured to the front end of the communicating tube 22 are a number of radially extending support arms 24, which are secured at their outer ends to the booster disc 7 by means of a retainer plate 25.

The communicating tube 22 defines an axial passage 26 therein to provide communication between the first power chamber 5 and the space 23 in the first valve port 12. The input member 8 is provided with radial passages 27 communicating the first valve port 12 with the second power chamber 6. In this manner, the first and second power chambers 5 and 6 are normally held in fluid communication with each other, as illustrated in FIG. 1.

Arranged in the first power chamber 5 is a flanged output transmitting member 28 which is axially fitted over the front end of the communicating tube 22 for sliding movement relative thereto and member 28 has an axially forwardly extending projection held in fitting engagement with an output rod 29, which carries an end piece 30. As will readily be understood, the output rod 29 is axially displaceable to engage the piston member of a master cylinder, not shown, which is arranged in front of the booster casing 1, to drive such piston by means of the end piece 30.

A coiled spring 31 is arranged between the front section 2 of the booster casing 1 and the booster disc 7 to hold the latter and the flanged output transmitting member 28 in the illustrated position as long as the braking system remains inoperative.

Reaction means are arranged in recesses 32 formed in the booster disc 7 on the front side thereof to serve the purpose of enabling the operator to feel the magnitude of the servo-motor output or the force acting upon the output member of the servo-motor by way of the input member 8, which acts upon the output member through the reaction means when acted upon by the operator, as will be described below in detail.

Figure 2:
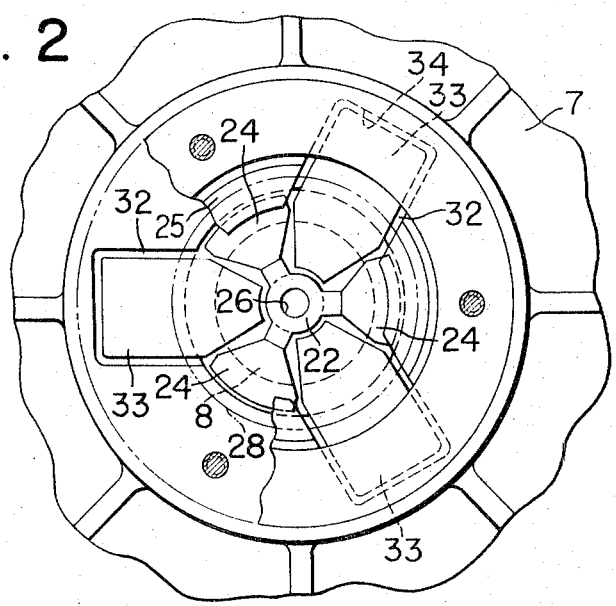
FIG. 2 is a cross-sectional view thereof taken along line II—II in FIG. 1.

The reaction means include a number of radially arranged rocker levers or plates 33 bridging or extending between the front end of the input member 8 and the front side of the booster disc 7. As clearly seen in FIG. 2, the rocker levers 33 are each accommodated in the associated recess 32 radially between the radially outer end wall 34 of the associated recess 32 and the communicating tube 22 and circumferentially between the adjacent two support arms 24 of the communicating tube 22 so as to be held against both radial and angular displacements. Also, the flanged output transmitting member 28 has an axially projecting edge 35 formed around the periphery thereof and held in pressure contact with the rocker levers 33 intermediate the ends thereof to press levers 33 against the front end face of the inlet member 8 and against the bottom faces 36 of the respective recesses 32 in the booster disc 7.

When the braking system is in a released or unapplied state, the input member 8 is held in the normal position illustrated with its annular stop 11 bearing against the adjacent annular edge of the booster disc 7 under the bias of coiled valve spring 10, the booster disc 7 itself being held in its normal rearmost position under the bias of coiled spring 31. Further, in the valve chamber 13, the valve element 14 has its sealing face 14' normally held against the first valve port 12 under the bias of coiled spring 15 to seal the valve chamber 13 from the space 23 adjacent to the sealing face 14' of the control valve element 14.

In this state, the first power chamber 5, at all times communicating with a vacuum source, is in communication with the second power chamber 6 to maintain vacuum in the latter through the annular space 37 between the flanged output transmitting member 28 and retainer plate 25, axial passage 26 in the communicating tube 22, space 23 adjacent to the sealing face 14' of the control valve element 14 and the radial passages 27 in the input member 8 so that the two power chambers 5 and 6 are in equilibrium with each other under vacuum.

To activate the brake system, the operator steps on a brake pedal, not shown, to cause the push rod 16 associated therewith to push forward the bearing disc 17. As a consequence, the input member 8 is displaced relative to the booster disc 7 against the bias of coiled valve spring 10 so as to push the radially inner ends of the rocker levers 33 slightly forward.

With this displacement, the spacing between the second valve port 21 formed at the rear end of the communicating tube 22, which is fixed to the booster disc 7, and the sealing face 14' of the valve element 14 is closed to break communication between the axial passage 26 in the communicating tube 22 and the valve chamber 13. Such sealing engagement of the valve element 14 with the second port 21 is ensured even if the first valve port 12 and second valve port 21 are slightly out of parallelism with each other owing to the fact that the region of the valve element 14 axially opposite the second valve port 21 is formed relatively thin as indicated at 14b in FIG. 1 and readily deformable under the pressure of engagement with the second valve port 21 to accommodate such slight non-parallelism.

Subsequently, as the push rod 16 is pushed further to displace the input member 8 axially forwardly, the second valve port 21 previously placed in pressure engagement with the sealing face 14' of the valve element 14 acts to cause the latter to be separated from the first valve port 12 in the input member 8 against the bias of coiled spring 15. This allows atmospheric air to flow through the air filter elements 18, air passages 19 in the bearing disc 17, now opened first valve port 12, and the radial passages 27 in the input member 8 into the second power chamber 6. It will be understood that the first power chamber 5 remains under vacuum with the second valve port 21 closed to break communication between the axial passage 26 and the radial passages 27.

The pressure difference thus occurring between the first and second power chambers 5 and 6 causes the movable wall or diaphragm 4 and booster disc 7 to move forwardly against the bias of coiled spring 31 in co-operation with the forward thrust being exerted on the booster disc 7 by the input member 8 through the intermediary of coiled spring 10 in the second power chamber 6 whereby the piston of the associated master cylinder is actuated for braking operation by the output rod 29 displaceable with the output transmitting member 28.

On this occasion, it will be noted that the reaction to the braking power is transmitted through the output rod 29, output transmitting member 28 and rocker levers 33 to the input member 8 and that the force of reaction thus fed back to the input member 8 is reduced in magnitude to a few tenths of the actual output force of the servo-motor, depending upon the lever ratio of the rocker plates 33, that is, the ratio of the distance between the radially inner end of each of the rocker levers bearing against the front end of the input member 8 and the intermediate point at which the rocker lever is engaged by the flanged member 28 to the distance between the radially opposite ends of each of the rocker levers. In this manner, the operator can feel the actual braking condition through the reaction means including rocker levers 33 in a uniquely light and accurate manner.

When subsequently released to disengage the brake, the input member 8 and booster disc 7 are restored with the associated parts to their normal rearmost position shown in FIG. 1 under the bias of the coiled springs 31, 10 and 15, placing the second power chamber 6 again in fluid communication solely with the first power chamber 5 through the radial passages 27, second valve port 21, axial passage 26 and annular space 37, and thus the entire servo-motor is restored to the normal state of equilibrium to release the brake system.

It is to be noted that in the operation described above the master cylinder associated with the servo-motor can be activated effectively even if the vacuum system is not operating properly, since the input member 8 when pushed forward acts upon the flanged output transmitting member 28 in a positive manner to push the latter forward through the rocker levers 33, each of which is held intermediate its ends in pressure engagement with the annular edge 35 of the flanged member 28, as described.

In summary, the present invention provides a new and improved servo-motor which has incorporated therein a reaction device of simple construction that enables the operator to properly actuate the input member of the servo-motor while accurately feeling the actual load on the output of the servo-motor through a reaction force of a magnitude substantially reduced relative to the output load without the danger of being forced back by the load reaction. The reaction device according to the invention is also advantageous in that the magnitude of the reaction force to be felt by the operator can be readily adjusted as desired by varying the arm lengths of the rocker levers, that is, the distances between the points of contacting engagement thereof with the associated components including the input and output members and the movable wall of the servo-motor. Also, the single valve element incorporated in the servo-motor to cooperate with the first and second valve ports is of simple and resiliently yieldable structure and operable, in the process of alternately opening and closing the two valve ports, to momentarily close both of them at the same time thereby to prevent the vacuum being continuously fed to the first power chamber from leaking uselessly to the atmosphere for efficient vacuum operation even if the parallelism between the first and second valve ports be impaired, for example, by some possible tilt of the communicating tube.

Although one preferred embodiment of the present invention has been shown and described, it will be understood by those skilled in the art that the apparatus of the invention may be changed and modified without departing from the spirit of the invention or from the scope of the appended claims.

What is claimed is:

1. A vacuum-suspended type servo-motor comprising: a casing; a movable wall arranged in said casing to divide the interior space thereof into two compartments, including a first power chamber continuously communicating with a source of vacuum and a second power chamber normally communicating with said first power chamber, said movable wall being displaceable by pressure difference between said first and second power chambers; an input member slidably fitted in said movable wall; an output member; reaction means operably connecting said output member with said input member and said movable wall; and control valve means normally holding said second power chamber in communication with said first power chamber and operable upon forward movement of said input member to close off the communication between said first and second power chambers and subsequently to place said second power chamber in communication with the external atmosphere; said reaction means including rocker levers each extending between said input member and said movable wall and held intermediate the ends thereof in engagement with said output member whereby, when said output member is loaded by forward movement of said input member, the load reaction is partially transmitted to said input member through said rocker levers, said control valve means being provided with a valve chamber within said input member and communicating with the external atmosphere, a first valve port formed in said input member and communicating with said valve chamber and said second power chamber, said control valve means comprising a communicating tube having opposite ends, a plurality of support arms radially extending from one end of said communicating tube to mount said tube on said movable wall, said tube being slidably fitted in said input member axially thereof, said communicating tube defining at the other end thereof a second valve port which opens coaxially with said first valve port, said tube communicating at said one end with said first power chamber, and a valve element accommodated in said valve chamber and normally biased toward said first and second valve ports; said output member including an output transmitting flange at the rear end thereof for engagement with said rocker levers intermediate the ends thereof, said rocker levers being each rockably arranged between two adjacent support arms of said communicating tube which prevent circumferential displacement and between said communicating tube and a projection formed on the front side of said movable wall which prevent radial displacement.

2. A servo-motor as claimed in claim 1, in which said valve element is constituted of resilient material and has a sealing face common to said first and second valve ports and including a relatively rigid portion co-operable with one of said valve ports and a readily deformable portion co-operable with the other valve port.

3. A servo-motor as claimed in claim 2 wherein said deformable portion of the valve element is provided with recesses in the rear wall thereof.

* * * * *